Nov. 13, 1928.                          1,691,488
               H. V. LUDWICK
                   WHEEL
              Filed Aug. 1, 1922
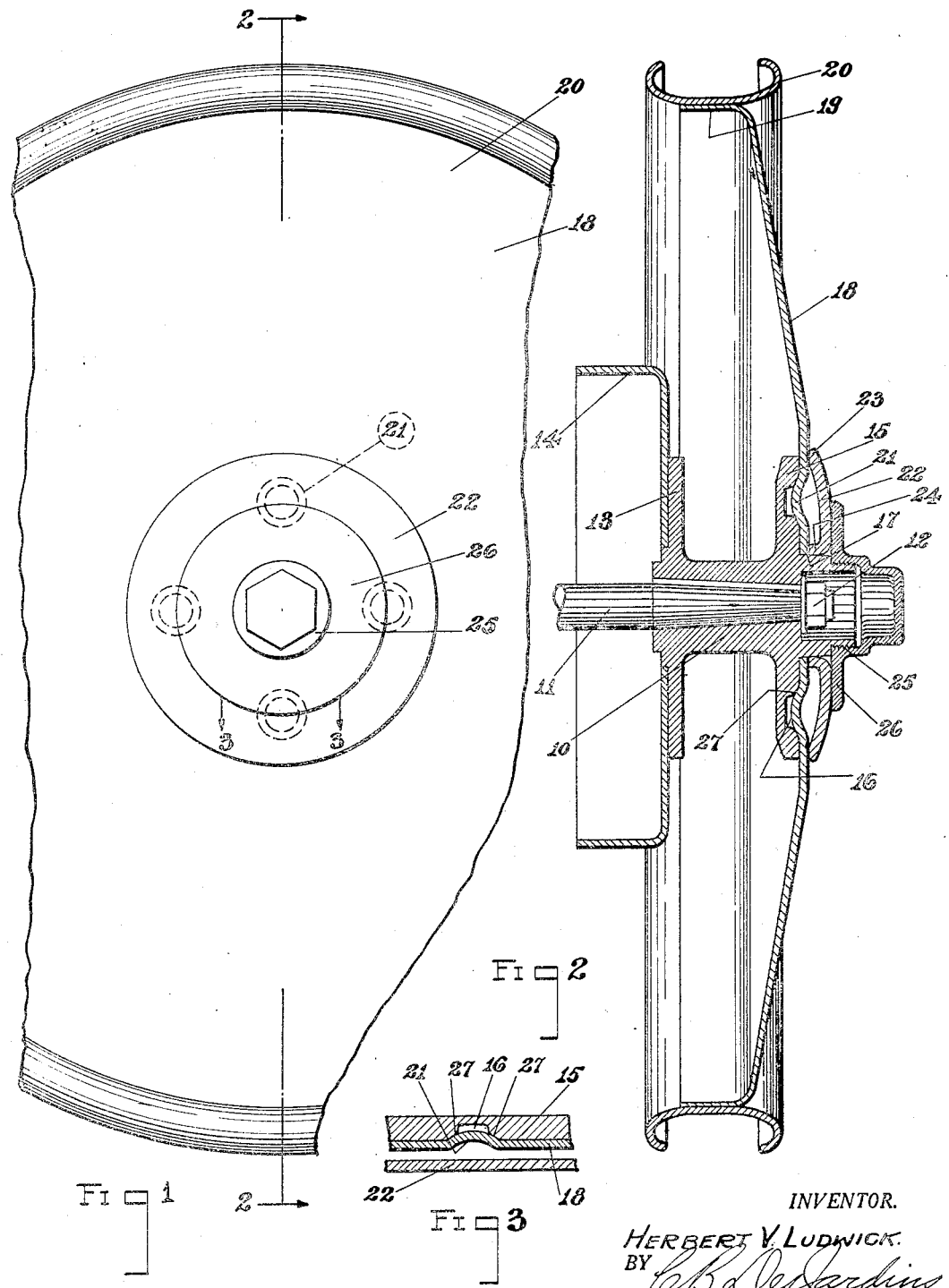
INVENTOR.
HERBERT V. LUDWICK.
BY
                    ATTORNEY
WITNESS:-
Walter M. Trout.

Patented Nov. 13, 1928.

1,691,488

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

WHEEL.

Application filed August 1, 1922. Serial No. 578,899.

My invention relates to improvements in wheels and has to do, more particularly, with demountable disc wheels for automobiles.

The main object of my invention is to provide a demountable disc wheel construction which is simple, effective, light and may be manufactured at a low cost.

A further object of my invention is to provide a demountable disc wheel construction having an improved driving connection between the hub and the wheel disc.

Another object of my invention is to provide a demountable disc wheel construction having a hub which is very light and cheap to manufacture.

A further object of my invention is to provide an improved driving connection between a disc and hub, in which the disc is resiliently clamped in position.

Further objects, and objects relating to details and economies of operation and construction will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is a fragmentary view in elevation of a wheel embodying my invention.

Fig. 2 is a sectional view through the wheel taken on the line 2—2 of Fig. 1, and Fig. 3 is a detail, sectional view, taken on line 3—3 of Fig. 1.

In the drawing, the same reference numerals refer to the same parts throughout. The several views and the sectional views are taken looking in the direction of the arrows at the ends of the section lines.

A demountable disc wheel comprises a hub and a wheel disc carrying the rim and tire and detachably mounted on the hub. It is necessary to provide a detachable driving connection between the wheel disc and the hub of such a nature that the two parts turn as one, in use, but may be separated from each other very readily and quickly when it is desired to remove the disc in changing wheels. It is particularly desirable to keep the weight of these wheels as low as possible and, of course, it is always desirable to cut the cost of manufacture to the lowest possible point, while producing a wheel which is strong and durable and will stand up under the conditions which it has to meet in use. In demountable wheel constructions in use at the present time, the construction of the hub to permit of the detachable connection between the disc and the hub is such as to add greatly to the weight and cost of the wheel. The purpose of my invention is to provide a demountable wheel construction having a hub which is very greatly simplified, is light and can be manufactured at a low cost. I propose to provide a hub having a radial flange provided with a plurality of recesses spaced at equal distances from the axis of the hub. I propose to provide a wheel disc, having a central opening which fits over the hub, in accordance with the usual practice, and provided with a plurality of bosses formed in the disc at equal distances from the center thereof and adapted to fit the recesses in the hub flange. The disc is clamped in position on the hub and forced toward the hub flange, so that the driving bosses of the disc seat in the recesses on the hub flange, by any suitable retaining means, which, preferably, include a spring washer so that the disc is resiliently clamped in driving position.

The wheel illustrated in the drawing as a preferred embodiment of my invention consists of a hub, 10, which is secured on the axle shaft, 11, by the nut, 12, and usual key. The hub, 10, may be provided with a flange, 13, to which the brake-drum, 14, is secured. The hub is also provided with a radial flange, 15, having a plurality of recesses or sockets, 16, located at equal radial distances from the axis of the hub. The hub, 10, is also provided with a conical shoulder, 17, at the base of the flange, 15, and the outer end portion of the hub is threaded to receive the hub cap, as will be described. The wheel disc, 18, is shown tapered, being of less thickness toward the periphery than at the center, so as to reduce the peripheral weight of the wheel. This is desirable but it is not necessary and my invention is not restricted to wheels employing tapered discs. The wheel disc, 18, has a peripheral flange, 19, to which the rim, 20, is secured, and is provided with a central opening through which the conical shoulder, 17, extends. The disc, 18, is provided with a plurality of convex bosses, 21, pressed in the disc and arranged at equal radial distances from the center thereof. These bosses are adapted to engage in the sockets, 16, of the flange, 15, to effect a driving connection between the disc and the hub. A spring washer, 22, is provided with an inturned flange, 24, at the edge of the central opening therein, which flange fits upon the conical shoulder, 17, of the hub. The inner edge of this flange engages the portion of the disc around the central opening therein and is adapted to clamp the same against the base of the flange, 16. The washer, 22, is dished, somewhat, and the periphery, 23, thereof engages the disc, 18, in an annular zone of contact, adjacent the periphery of the flange, 15. When pressure is applied to the washer it tends to flatten out and is thus put under tension so that it acts like a spring washer. The washer, 22, is forced toward the disc, 18, and the flange, 15, by the nut or hub cap, 25, screwed on the threaded end of the hub and having a flange, 26, engaging the washer, 22. The sockets, 16, are preferably countersunk, presenting the beveled outer edge portion, 27, as shown in Figs. 2 and 3, so as to provide a greater surface in contact with the bosses on the disc when the latter is forced against the flange, 15.

The removal of the wheel disc, 18, when it is desired to change wheels, is very simple. The hub cap, 25, is unscrewed, the washer, 22, is removed from the shoulder, 17, and the disc, 18, may then be removed from the hub. In mounting a wheel disc carrying a rim and tire on the hub, 10, all that is necessary is to place the disc, 18, on the hub with the shoulder, 17, extending through the central opening in the disc and the several bosses, 21, lined up with the sockets, 16, in the hub flange, 15. The washer, 22, is then slipped on the shoulder, 17, in front of the disc, 18, and the hub cap, 25, screwed on the end of the hub with the flange, 26, engaging the washer. As the hub cap is screwed up, the washer, 22, is forced toward the disc until the flange, 24, of the washer engages the disc adjacent the central opening therein, and the periphery, 23, of the washer engages the disc substantially at the periphery of the hub flange, 15. The force exerted by the screwing up of the hub cap, 25, causes the washer, 22, to contact with the disc in two annular zones of contact, at which zones of contact a force is exerted on the disc, clamping it against the hub flange, 15. These two zones of contact are located on opposite sides of the area in which the bosses, 21, are located, so that the disc, 18, is clamped to the hub flange, 15, on opposite sides of the interengaging portions of the flange and disc which transmit the drive from one to the other. I have already pointed out the fact that the washer, 22, tends to flatten out when force is applied to it, thus acting like a spring washer and serving as a resilient means for clamping the disc on the hub. The hub and disc are caused to turn as one and force is transmitted from the hub to the disc by the engagement of the bosses, 21, in the sockets, 16.

It will be observed that the hub, 10, is of very simple construction and can be readily manufactured, inasmuch as the only parts which require particular care in manufacture are the sockets, 16, and these can be readily produced. The disc, 18, is very simple and the sockets, 21, can easily be pressed in the disc at the same time that the other forming operations are performed upon it. The washer, 22, is a simple stamping which can be made in large numbers at a very low cost. The same is also true of the hub cap, 25. Consequently, this wheel construction is one which can be manufactured very cheaply but which, nevertheless, provides for the quick interchange of wheels by the ready mounting and dismounting the wheel disc and provides a wheel construction which is, at the same time, cheap, light, attractive in appearance and convenient to use.

I am aware that the wheel construction illustrated in the accompanying drawing may be changed considerably without departing from the spirit of my invention and, therefore, I claim my invention broadly, as indicated by the appended claims.

Having thus described my invention, what I claim as new and useful and desire to secure by Letters Patent is:

1. In a wheel the combination of a hub having a radial flange, a wheel disc mounted on said hub, an annular member mounted on the hub and engaging the disc in two spaced zones of contact, said disc and flange having interengaging portions located between said zones of contact and preventing relative rotation of the disc and flange, and means mounted on said hub for forcing said annular member against the disc to clamp said disc against the flange.

2. In a wheel the combination of a hub having a radial flange provided with a plurality of sockets and a shoulder at the base of said flange, a disc having a central opening through which said shoulder extends and provided with a plurality of convex bosses adapted to engage in said sockets, and means mounted on and encircling said hub and engaging said disc to clamp it against the hub flange with said bosses engaging in said sockets to prevent rotation of the disc relative to the hub.

3. In a wheel the combination of a hub having a radial flange provided with a plurality of sockets therein arranged at equal radial distances from the axis of the hub, a wheel disc mounted on the hub and provided with a plurality of convex bosses adapted to engage in said sockets, a spring washer mounted on the hub and engaging said disc, and means engaging said hub and said washer to yieldingly clamp the disc against the hub flange with said bosses engaging in said sockets to prevent rotation of the disc relative to the hub.

4. In a wheel the combination of a hub having a radial flange provided with a plurality of sockets therein arranged at equal radial distances from the axis of the hub, a wheel disc mounted on the hub and provided with a plurality of bosses adapted to engage in said sockets, a washer mounted on the hub and engaging the disc in two spaced zones of contact on opposite sides of said bosses, and a hub cap screwed on said hub and engaging said washer to clamp the disc against said hub flange.

5. In a wheel the combination of a hub having a radial flange provided with a plurality of countersunk sockets therein, a wheel disc mounted on said hub and having bosses pressed therein and adapted to engage said countersunk sockets, and a unitary means encircling said hub engaging said disc to clamp the same against said hub flange with said bosses engaging in said sockets to prevent rotation of the disc relative to the hub.

6. In a wheel, the combination of a hub having a radial flange, a wheel disc mounted on said hub, said disc and flange having interengaging portions preventing relative rotation of said disc and flange, and clamping means engaging said disc between the rim and said interengaging portions and clamping said disc against said flange and extending over and concealing said interengaging portion of said disc.

7. In a wheel, the combination of a hub having a radial flange, a wheel disc mounted on said hub, said disc and flange having interengaging portions preventing relative rotation of said disc and flange, and clamping means engaging said disc between the rim and said interengaging portions and clamping said disc against said flange, said interengaging portions being concealed between said flange and said clamping means.

In testimony whereof, I affix my signature.

HERBERT V. LUDWICK.